(12) United States Patent
Kueny

(10) Patent No.: US 9,386,241 B2
(45) Date of Patent: Jul. 5, 2016

(54) APPARATUS AND METHOD FOR ENHANCING DYNAMIC RANGE OF CHARGE COUPLED DEVICE-BASED SPECTROGRAPH

(75) Inventor: Andrew Weeks Kueny, Dallas, TX (US)

(73) Assignee: Verity Instruments, Inc., Carrollton, TX (US)

( * ) Notice: Subject to any disclaimer, the term of this patent is extended or adjusted under 35 U.S.C. 154(b) by 0 days.

(21) Appl. No.: 10/612,125

(22) Filed: Jul. 2, 2003

(65) Prior Publication Data

US 2005/0001914 A1    Jan. 6, 2005

(51) Int. Cl.
| | |
|---|---|
| H04N 5/347 | (2011.01) |
| H04N 3/14 | (2006.01) |
| G01J 3/28 | (2006.01) |
| H04N 5/355 | (2011.01) |
| H04N 5/3728 | (2011.01) |

(52) U.S. Cl.
CPC ............ *H04N 5/347* (2013.01); *H04N 3/1562* (2013.01); *G01J 3/2803* (2013.01); *H04N 3/155* (2013.01); *H04N 3/1525* (2013.01); *H04N 5/35563* (2013.01); *H04N 5/3728* (2013.01)

(58) Field of Classification Search
USPC ......... 348/294, 311, 312, 314, 316, 317, 320, 348/321, 322, 323, 362, 367; 257/291, 292, 257/231, 232, 225; 250/208.1
See application file for complete search history.

(56) References Cited

U.S. PATENT DOCUMENTS

| | | | | |
|---|---|---|---|---|
| 5,198,816 | A | * | 3/1993 | Kalinowski et al. ........... 341/137 |
| 5,585,847 | A | * | 12/1996 | Sayag ............................ 348/266 |
| 5,675,411 | A | | 10/1997 | Brooks et al. |
| 5,965,910 | A | * | 10/1999 | Wood ............................ 257/231 |
| 5,986,267 | A | * | 11/1999 | West ........................ 250/370.08 |
| 6,175,383 | B1 | | 1/2001 | Yadid-Pecht et al. |
| 6,252,627 | B1 | * | 6/2001 | Frame et al. .................. 348/311 |
| 6,801,309 | B1 | * | 10/2004 | Nelson .......................... 356/307 |

OTHER PUBLICATIONS

Technical Manual, "An Introduction to Scientific Imaging Charge-Coupled Devices," Scientific Imaging Technologies, Inc., Beaverton, OR, 1994.

* cited by examiner

*Primary Examiner* — Justin P Misleh

(57) ABSTRACT

The present invention is directed to an apparatus, method and software product for enhancing the dynamic range of a CCD sensor without substantially increasing the noise. Initially, the area of a N×M pixel CCD sensor array is subdivided into two regions, a large region having (M−a) pixels in each column for outputting large-amplitude signals with low noise and a smaller region having a pixels in each column for outputting small-amplitude signals with improved dynamic range. At integration time, the CCD is read out one region's rows at a time into the horizontal shift registers by shifting the pixel charges in either a or M−a vertical shifts. The charges in the horizontal shift registers are then shifted out of the horizontal shift registers in N horizontal shifts. Next, the remaining pixels in the region of the CCD are read out into the horizontal shift registers by shifting the pixel charges in the other of a or M−a vertical shifts. Those charges are then shifted out of the horizontal shift registers in N horizontal shifts. In a spectrographic application, the data from the two regions is read out in the form of a large-amplitude channel from the larger region's rows and a small-amplitude channel from the smaller region's rows.

25 Claims, 13 Drawing Sheets

APPARATUS AND METHOD FOR ENHANCING DYNAMIC RANGE OF CHARGE COUPLED DEVICE-BASED SPECTROGRAPH

BACKGROUND OF THE INVENTION

1. Field of the Invention

The present invention relates to optical imaging. More particularly, the present invention relates to reading out spectral data from an optical sensor. Still more particularly, the present invention relates to an apparatus, method and software program product for enhancing the dynamic range of spectral data read from an imaging sensor.

2. Description of Related Art

The present invention relates to optical spectroscopy measurement instruments which employ an array of sensors in the focal plane to provide substantially simultaneous measurement of light intensity at multiple wavelengths over a broad wavelength range. The advantage of being able to monitor many wavelengths at once has led to the proliferation of these instruments, known collectively as spectrographs. Prior to the development of solid state sensor arrays, the spectroscopy instrument of choice was the monochromator. In a monochromator, a single narrow wavelength region is selected for measurement, and a single detector is used. The ability to make simultaneous independent measurements at different wavelengths is a significant advantage in many applications. Nevertheless, performance limitations of available detector arrays often prevent the use of spectrographs in some demanding applications. One important limitation is dynamic range. It is a general property of solid state sensor arrays that they can only simultaneously measure signals whose magnitude lies within a specific range known as the dynamic range. It is this limitation that is addressed by this invention.

A spectrograph in the prior art consists of an optical imaging system, a light detecting system, and a data processing element. The optical imaging system analyzes light into its component spectral features. The analyzed light is converted to an electrical signal by the light detecting system, and the electrical signal is converted to a numerical or graphical representation of the light's intensity as a function of wavelength and time by the data processing element.

A good detailed description of the optical imaging component of a spectrograph is "The Optics of Spectroscopy: a Tutorial," by J. M. Lerner and A. Thevenon, which is incorporated herein by reference in its entirety. It is available on the World Wide Web at the site of the Jobin Yvon Horiba company at jvhoriba.co.uk/jy/oos/oosl. In a typical spectrograph, light enters through a slit and is dispersed by a grating or prism by an angle dependent on the wavelength. The slit is imaged in the focal plane, and the image can be visualized as a rectangle with the long dimension which corresponds to wavelength determined by the dispersion (FIG. 1). The useful wavelength range of the spectrograph consists of a continuous distribution in wavelength between short and long wavelength limits $\lambda_1$ and $\lambda_n$. The other dimension is determined by the slit length, the imaging characteristics of the optics, and the required performance, since in practice, the wavelength separation is usually best in the middle and degrades as one goes towards the edges.

The light detection system in a spectrograph is a detector array placed in the focal plane which allows readout of the spectral information. In order to have good spectral resolution, it is desirable that the individual sensor elements (pixels) be small in the wavelength dimension. A typical dimension is on the order of 10 micrometers. In the other dimension, it is usually desirable to have each pixel be as large as possible, up to the useable dimension of the image, in order to have a good signal-to-noise ratio. For spectrographs used in the ultraviolet to near-infrared range (about 190 nm to 1100 nm), photodiode arrays (PDAs), charge-coupled devices (CCDs) and charge injection devices (CIDs) are commonly used detectors.

PDAs are linear arrays of square or rectangular sensors. In this application, the sensors are distributed along the wavelength axis of the image. In that direction, a typical dimension is on the order of 10 micrometers. In the other direction, the pixels may be as long as several hundred microns or longer. An example of a PDA designed for spectroscopy is the RL1210LGQ-711 made by Perkin Elmer Optoelectronics, Inc., 2175 Mission College Boulevard, Santa Clara, Calif. 95054; Telephone: (408) 565-0850) which has a total light sensing area of 2.5 mm by 25.6 mm. It is divided into 1024 sensor elements each with dimensions of 25 microns by 2500 microns. The rectangular pixels are suited to the simultaneous requirements of being small along the wavelength axis and large along the slit direction.

For demanding applications, however, CCDs are often preferred over PDAs, since in CCDs the inherent electrical noise can be made much lower. A detailed description of a modern CCD used for spectroscopy can be found in the document "An Introduction to Scientific Imaging Charge-Coupled Devices" published by Scientific Imaging Technologies, Incorporated, which is incorporated herein by reference in its entirety and available on the World Wide Web at autovision.net/CCDs.pdf or site-inc.com/pdf/introdat.pdf. An example of such a CCD is the S7031-1007 device manufactured by the Hamamatsu Corporation of Japan (HAMAMATSU PHOTONICS K.K., Solid State Division; 1126-1 Ichino-cho, Hamamatsu City, 435-8558 Japan, Telephone: (81) 053-434-3311, Fax: (81) 053-434-5184, http://www.hamamatsu.com; U.S.A.: Hamamatsu Corporation: 360 Foothill Road, P.O. Box 6910, Bridgewater, N.J. 08807-0910, U.S.A., Telephone: (908) 231-0960. The total light sensing area of this device is 25.6 mm by 3.1 mm The total sensing area is nearly the same as that of the PDA referenced above, but, as is typical of CCDs, the individual pixels are small and square (24 microns on a side) and arranged in a two-dimensional array.

FIG. 2 is a diagram which generally depicts the functional elements of a typical CCD sensor including array 200 which is configured as a square (or rectangular) N×M array of pixels 202 having N lines of M pixels each, configured in a parallel shifting architecture, serial shift register 206 comprised of a plurality of individual shift registers, summing well 210 and amplifier 212. As shown in the diagram, array 200 is generally configured as N parallel lines of M pixels each. Each pixel is each coupled to another for transporting charges vertically down the columns, from row to row, in parallel to individual shift registers 206-1 through 206-N of serial shift register of serial register 206. Each of pixels 202 transfers charge vertically in only one direction. The last row of the array is serial (or horizontal) shift register architecture 206 which transfers charge in an orthogonal direction to that of the parallel architecture using shift registers 206-1 through 206-N using the same coupling between registers. Every pixel may be read individually, or the charge from groups of pixels may be read together in various ways.

As well understood by those of ordinary skill in the art, a CCD operationally converts light photons to charge in any pixel being struck by the photon and the charge is then held in the pixel well until readout. An individual pixel well holds a finite amount of charge, which is defined as its full well capacity, above which the well becomes saturated. The period of time that the CCD sensor is exposed to light and charge is allowed to accumulate in the pixel wells is referred to as the "integration time." After the integration time has elapsed, the array is read. In the case where the signal from each pixel is to be read individually, array readout commences by the simultaneous clocking all rows of charges one pixel toward horizontal shift registers 206-1 through 206-N. The charges are shifted between pixels 202 by means of the parallel shift architecture from one horizontal row of pixels to the next horizontal row from top to bottom of pixel array 200. The bottom row of charge is transferred into the linear array of shift registers 206-1 through 206-N. Serial shift register architecture 206 then serially transfers the charge out of the sensor, making room for the next row to be shifted down, and the next, and so on. The resulting stream is a pixel-by-pixel, row-by-row representation of the photons striking the CCD sensor. However, prior to being transferred serially off-chip, each pixel's charge is amplified by amplifier 212, resulting in an analog output signal of varying voltage which is proportional to the pixel charge. Located between amplifier 212 and last serial shift register 210-N is summing well 210, which is used for pixel binning operations.

In an effort to further reduce electrical noise and improve the signal-to-noise ratio, albeit at the expense of reduced spatial resolution, the array can be read by a process known as "pixel binning." Pixel binning is generally understood by those of ordinary skill in the art as a clocking scheme used to combine the charge collected by adjacent CCD pixels. Binning the charge from blocks of adjacent pixels reduces noise by creating a larger sample area on the CCD. Binning is typically performed in either "area binning mode" or "line binning mode." In area binning mode charge from a square or rectangular array of pixels is combined into a super-cell value by the sensor and then output for further processing, e.g., 2×2 binning combines the charges from a block of four pixels into a single output signal; 3×3 binning combines the charge from nine pixels and so on.

The 2×2 binning process involves two consecutive vertical shifts into the serial shift register, and a series of horizontal shifts, two at a time, into the summing well. Operationally, following the integration period, the charge from the two horizontal pixel rows closest to the horizontal shift registers are read in parallel readout and shifted into their respective horizontal shift registers, thereby aggregating two pixel's charges into a single horizontal shift register. The charge from every other pixel in each line is also transferred two pixels closer to the horizontal shift registers. After two vertical shifts, two consecutive horizontal shifts move the charge from two end registers into the summing well. The summing well then holds a cumulative charge from the 2×2 block of pixels, which is then amplified and converted to a voltage for further off-chip amplification and digitization. Charge from any number of pixels can be shifted into a shift register, but once the well of the shift register is saturated, any additional charge shifted from the pixels is disregarded. If any charge is not retained in a horizontal shift register, the intensity for the binned pixel is incorrect, i.e., reduced by the amount of the charge not retained in the line shift register. In spectroscopy applications, line binning mode is typically used for readout. FIG. 3 is a diagram depicting the spectral image of FIG. 1 superimposed over the sensing portion of the pixel array of a CCD sensor as depicted in FIG. 2. Notice from the diagram that the spectra wavelengths correspond to the vertical lines of pixels in array 200. Since the individual pixels are small, the signal from many pixels corresponding to the same wavelength are typically binned to effectively create a single rectangular sensor for each wavelength. By using this correspondence, the level of noise can be reduced and the signal-to-noise ratio is improved by binning the pixels corresponding to the spectra wavelengths into a single super-cell. This is done by reading the CCD in line binning mode.

FIG. 4 is a flowchart depicting a process for reading out an N×M pixel array CCD sensor in line binning mode according to the prior art. The binning process begins after each integration by vertically reading out the pixel signals of each line. Charge is shifted down the N vertical shift registers, in parallel row-by-row fashion, to the N horizontal shift registers (step 402). Vertical shifting accumulates the charge of each pixel line into the last shift register of the column, which is actually a horizontal shift register in the serial shift register. Next, the charge from each of the N pixel lines is shifted out of the N horizontal shift registers, column-by-column, in N horizontal shifts (step 404). Rather than summing these charges in a summing well, the line pixel data is output off the chip in a column-by-column fashion (step 406). The result of reading the CCD is an analog signal whose amplitude varies with time. The analog signal is then amplified, converted into a digital form, whereupon the necessary calculations are performed so that the data can be represented, e.g., as a table of light intensity vs. wavelength. Typically, the intensity values are presented as integer values within some convenient range, as, for example, 0-65535 in the case where a 16-bit digitizer is used.

The dynamic range of a CCD is related to the ratio of well depth to the readout noise, usually expressed in decibels. The limitation to dynamic range in a CCD-based spectrograph exists because there is a limit to the amount of charge that each pixel and each horizontal shift register can hold. Inaccurate measurements result if the charge accumulated in any pixel, or any shift register, reaches this saturation level. By contrast, several noise sources exist in the readout process which cause inherent uncertainty in the measurement of the charge in any shift register. Therefore, the useful range of a measurement is when the charge is between the inherent noise level and below the full-well, or saturation level. A typical dynamic range specification for a scientific-grade CCD intended for spectroscopy is 75000.

As alluded to above, the amount of charge which accumulates in a column of pixels of a spectroscopy CCD array is proportional to both the light intensity at the wavelength which illuminates that column and the amount of time that charge is allowed to accumulate before it is read. Again, that time is defined as the integration time. The integration time has to be chosen so that the quantity of charge in each column lies within the useful range. A problem occurs if the spectrum of interest includes regions of widely differing intensity, since there may be no single integration time which is suitable for the entire spectrum. Furthermore, for spectra including extremely bright features, it may not be possible to use an integration time short enough to prevent saturation of the brightest lines, since the minimum achievable integration time is the time it takes to perform one full vertical and one full horizontal shift.

The dynamic range limitation has been dealt with in many different ways, some of which are mentioned here. One way is to interleave spectral acquisitions using different integration times. A single composite spectrum with high dynamic range can be derived from individual spectra acquired using different integration times. However, this approach does not solve the problem of lines which are saturated at the shortest integration time. Another approach, described by Brooks (U.S. Pat. No. 5,675,411) which is incorporated herein by reference in its entirety, is to incorporate a photomask into the spectrometer to selectively attenuate bright lines. However, this approach is not applicable if the spectrograph is to be used to analyze diverse sources. Yet another approach is to modify the design of the sensor to improve the dynamic range. One example of this is the sensor described by Yadid-Pecht, et al. in U.S. Pat. No. 6,175,383, which is also incorporated herein by reference in its entirety. Yadid-Pecht et al. teach incorporating circuitry that allows the integration time on each pixel to be individually set. Considerations of cost and manufacturability, however, make it desirable to have an alternative approach which is applicable to existing high-performance CCDs of moderate cost.

BRIEF DESCRIPTION OF THE DRAWINGS

The novel features believed characteristic of the present invention are set forth in the appended claims. However, the invention itself, as well as a preferred mode of use, further objectives and advantages thereof, will be best understood by reference to the following detailed description of an illustrative embodiment when read in conjunction with the accompanying drawings wherein:

Other features of the present invention will be apparent from the accompanying drawings and from the following detailed description.

DETAILED DESCRIPTION OF THE INVENTION

The invention being disclosed here is a spectrograph consisting of an optical dispersing and imaging system, a CCD for light detection, and a data processor. The CCD employs a heretofore unknown pixel binning method, the "two-region line binning mode," for increasing the dynamic range over what can be achieved in the conventional line binning mode. The data processor converts the electrical signals produced in this method to a numerical or graphical representation of the light's intensity as a function of wavelength.

The presently described invention is applicable to spectrographs using a CCD with a two-dimensional array of pixels, wherein each parallel line pixels terminate in a shift register. The pixel lines may be oriented in one of the vertical (column) or horizontal (row) direction, but conventionally as a column in the vertical direction. Additionally, the present invention applicable for CCDs in which the full well capacity of the individual horizontal shift register is less than the sum full well capacities of the individual pixels making up a column, and is particularly applicable for CCDs in which the full well capacity of the shift registers is on the same order as (1 to 12 times) the pixel full well capacity. Examples of commercially produced charge coupled devices to which it applies are any of the CCDs of the S7030/S7031 series of CCD Area Sensors (HAMAMATSU PHOTONICS K.K., Solid State Division; 1126-1 Ichino-cho, Hamamatsu City, 435-8558 Japan; Telephone: (81) 053-434-3311; Fax: (81) 053-434-5184, http://www.hamamatsu.com; U.S.A.: Hamamatsu Corporation: 360 Foothill Road, P.O. Box 6910, Bridgewater, N.J. 08807-0910, U.S.A.; Telephone: (908) 231-0960.

In the Hamamatsu devices, the charge storage capacity of the horizontal shift registers is twice the capacity of an individual pixel. When these devices, and the like, are employed for spectroscopy in line binning mode, a single horizontal shift register receives the charge from up to 256 pixels, depending on the specific device. When a spectrum containing some bright spectral lines is read saturated, the shift registers fill up before the individual pixels do, provided only that the illumination along the columns is reasonably uniform. The spectrum is truncated at the maximum value for the shift register because any charge over the full well capacity of the shift register is disregarded. The presently described binning methodology prevents the knowledge of the amplitude of the bright lines from being lost without substantially reducing the signal-to-noise of the measurement of the small signals elsewhere in the spectrum.

Figure 2:
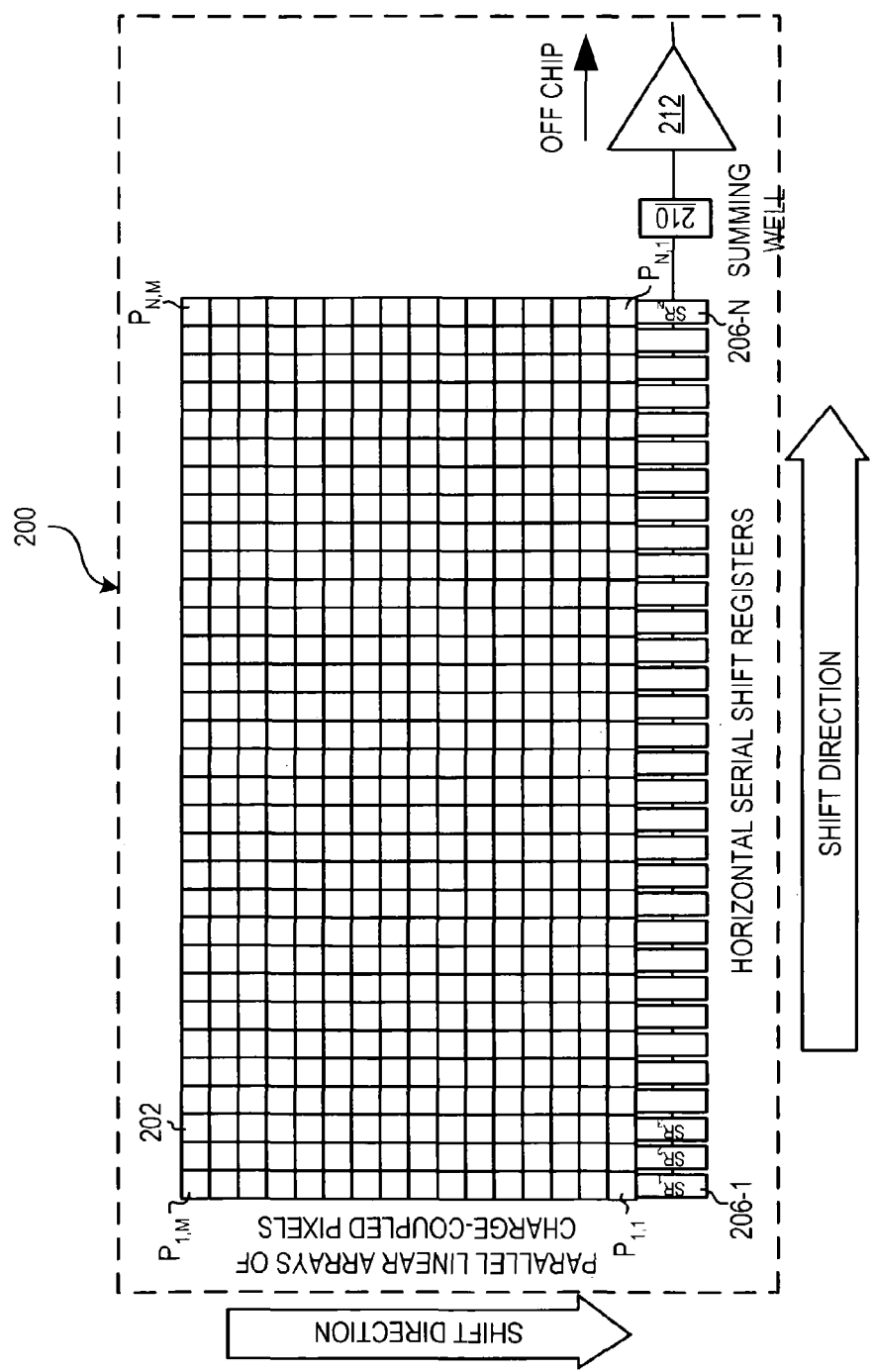
FIG. 2 is a diagram which generally depicts the functional elements of a typical CCD sensor as generally understood in the prior art.
Figure 3:
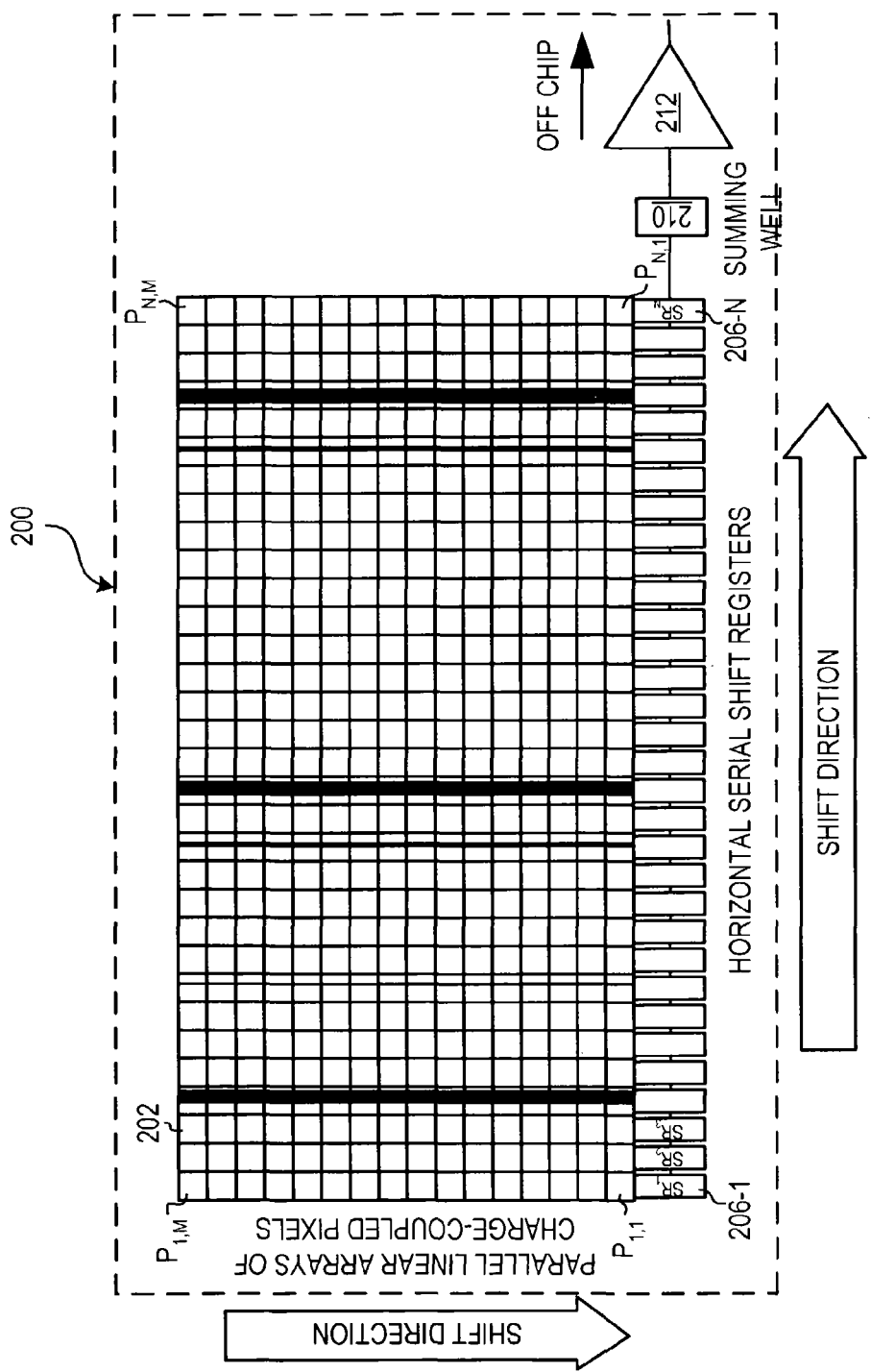
FIG. 3 is a diagram depicting the spectral image superimposed over the sensing portion of the pixel array of a CCD sensor as generally understood in the prior art.
Figure 4:
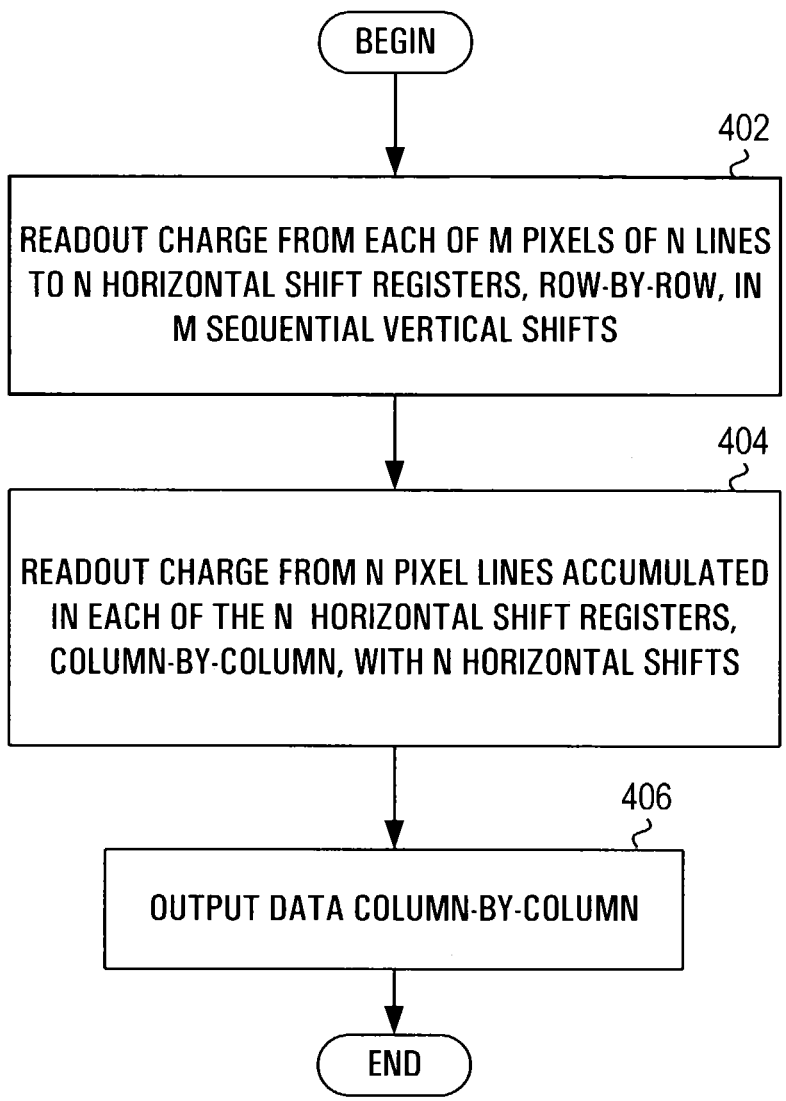
FIG. 4 is a flowchart depicting a process for reading out an N×M pixel array CCD sensor in line binning mode according to the prior art.
Figure 5:
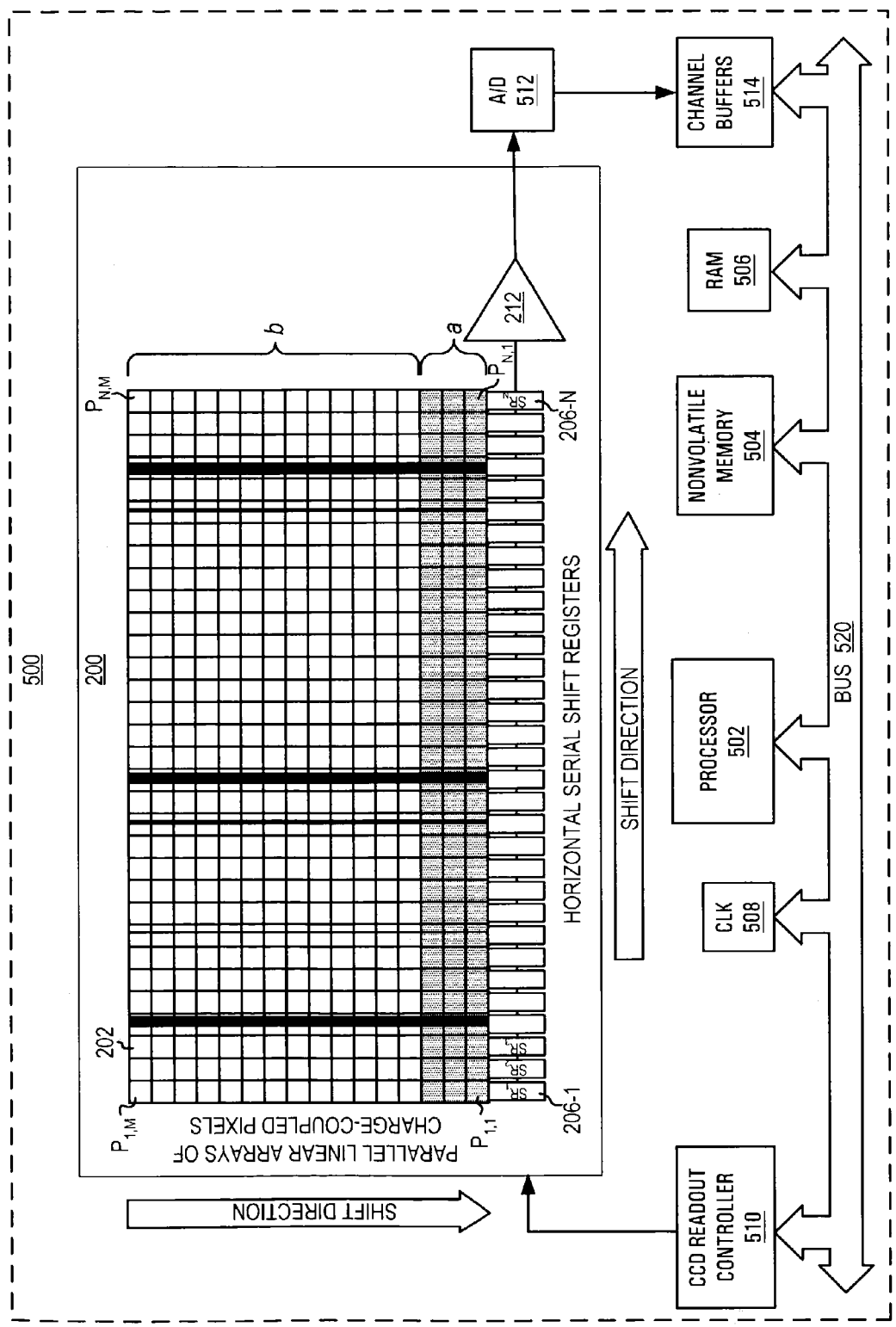
FIG. 5 is a diagram which generally depicts a typical CCD sensor, as known in the prior art, of N×M array of pixels which have been subdivided into region a and region b in accordance with an exemplary embodiment of the present invention.

This is briefly achieved by segmenting each (horizontal) line of the CCD array for binning as a small-amplitude channel and a large-amplitude channel. FIG. 5 is a diagram which generally depicts a device for enhancing the dynamic range of charge coupled device-based by carrying out two-region line binning in accordance with an exemplary embodiment of the present invention. Device 500 includes a typical CCD sensor, as shown in FIG. 2, generally comprising array 200 (configured as a square or rectangular) of N×M array of pixels 202, which have been subdivided into region a and region b in accordance with an exemplary embodiment of the present invention. Accordingly, the surface area of sensor 200 is shown as two separate regions: a smaller region having a×N pixels (depicted as the shaded region of pixels), and a large region having (M−a)×N pixels. The values of a and b will generally be chosen to optimize a specific case, but typically b will be between 10 and 100 times larger than a. Ordinarily, signals from region a will produce smaller amplitude levels, i.e., the small-amplitude channel (alternatively referred to as the a-channel), while signals from region b will produce amplitude levels, i.e., the large-amplitude channel (alternatively referred to as the b-channel). As can be understood from array 200 in FIG. 5, region a defines a number of pixel rows on the array and region b defines a number of pixel rows on the array such that for any column, a+b=M (where M is the total number of rows on array 200).

Device 500 also includes components for controlling the readout of CCD 200 and processing the signals obtained therefrom in accordance with other exemplary embodiments of the present invention. These components generally transfer and receive data, addresses, and timing along a series of system buses depicted herein generally as bus 520. The system components include processor 502 for executing instructions stored in memory, either nonvolatile memory 504 or RAM 506. These instructions pertain generally to device operations including readout shifting instructions for CCD 200 via CCD controller 510. System clock 508 provides system clocking for shift operations. Processors 502 may also execute instructions pertaining to post-processing of signals from CCD 200. Typically, these signals are output as analog and converted to digital representation using A/D converter 512 and buffered in channel buffers 514 while awaiting post-processing. Alternatively, the digital signal may be temporarily stored in RAM 504 prior to post-processing operations. Once processed, the data may be stored in RAM 506 or more permanently in nonvolatile memory 504. Eventually, the processed data are read out of memory and displayed. While embodiments of the present invention refer to device 500 as a spectrograph, it should be understood that the presently described invention may be implemented in any device currently using line binning for achieving enhancing dynamic range of charge coupled imaging device.

In accordance with one exemplary embodiment of the present invention, the spectrum is to be read independently from pixels located in each region. If the value of a is much smaller than that of b, then the large region b will yield a measurement which is not significantly degraded from what it would have been had the entire (a+b)×M region been read in conventional line binning mode. The amplitude reading from the large region b will yield a larger amplitude than that from the smaller region a and is referred to herein as the large-amplitude channel. Thus, the signal-to-noise ratio obtained from pixels in the column of region b (M−a pixels) remains comparable to that from the pixels in the respective column of M pixels. Another copy of the spectrum is read from region a (the smaller region). The amplitude reading from the small region a will yield a smaller amplitude than that obtained from the large region b and is referred to as the small-amplitude channel. Particular attention is paid to the bright portions of the spectrum which were saturated in the spectrum read from the large region b.

As mentioned elsewhere above, CCD array 200 is assumed to have N columns distributed along the dispersion (wavelength) direction, each consisting of M pixels. According to the prior art line binning readout mode employed in spectroscopy, the charge from each column of pixels is simultaneously shifted into a respective horizontal shift register, and then the charge is shifted out of the horizontal shift register and detected, as described in detail above. By contrast, and in accordance with an exemplary embodiment of the present invention, the CCD readout is performed in two parts. In the first part, a small number a of pixels from each column are transferred into their respective shift registers. Then the charge is shifted out of the horizontal shift register and detected in the usual manner to, for example, a storage for the small-amplitude channel where it is available for post processing. In the second part, the charge from the remaining pixels (b=M−a) in each column is transferred into the shift registers. Finally, the horizontal shift register is read a second time and the large-amplitude channel is stored in a separate storage for post-processing. Alternatively, the small- and large-amplitude channels may be processed on the fly.

Figure 6:
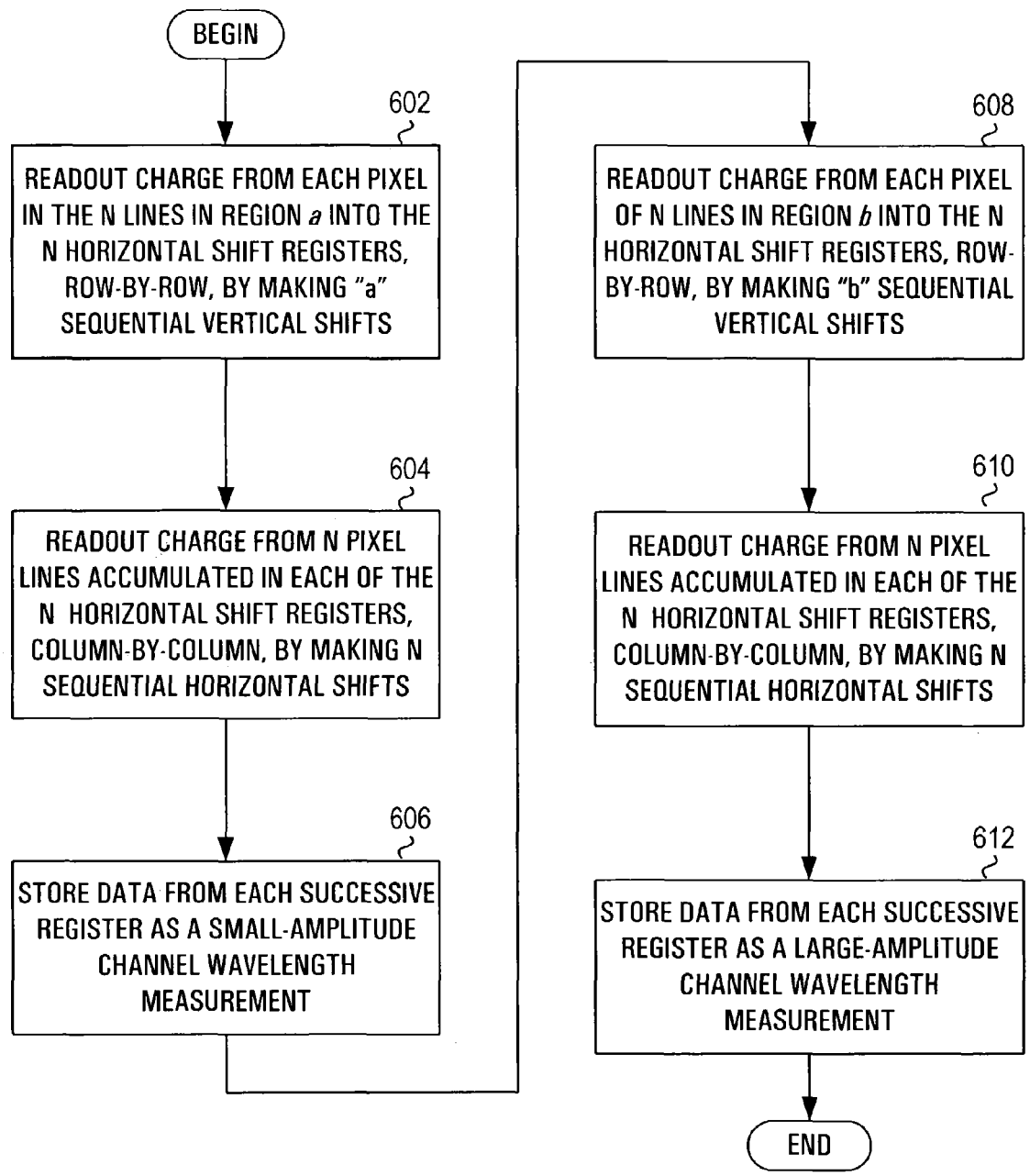
FIG. 6 is a flowchart depicting the process for reading out a N×M pixel array CCD sensor in two-region line binning mode in accordance with an exemplary embodiment of the present invention.

FIG. 6 is a flowchart depicting the process for reading out a N×M pixel array CCD sensor in two-region line binning mode in accordance with an exemplary embodiment of the present invention. The two-region line binning process is initiated once at the end of each integration period when at least some of the pixel wells have had sufficient time to accumulate charge. Because the small region a is adjacent to the horizontal shift registers, that region of the pixel array is read first; however, in this particular exemplary embodiment, large region b could just as well be defined as adjacent to the horizontal shift registers and one of ordinary skill level in the relevant art would readily appreciate modification to the present binning mode from the description below. Region a is read out of the first a rows of the array into the N horizontal shift registers for the respective pixel columns by making a total of "a" vertical shifts (step 602). The vertical shifting will shift not only the charge from the first a rows of the array, but all M rows. Subsequently, each of the horizontal shift registers will hold the accumulated charge from its pixel column. That charge is read out from the N horizontal shift registers in N sequential horizontal shifts (step 604). Because each of the N columns in the CCD sensor is associated with a discrete wavelength (or region of wavelengths), the accumulated charge represents intensity for the respective wavelengths, albeit small in amplitude. Thus, the data from each register can be transferred directly into storage as a small-amplitude channel wavelength measurement (step 606). Alternatively, and as will become more apparent from the disclosure below, the data from each register can be processed based on a relationship to the large-amplitude channel data for the particular wavelength (or pixel column). Once region a of the CCD array has been readout, region b can be read in a likewise manner. However, the charge from region b has now been shifted a rows closer to the horizontal shift registers during the previous vertical shifts. Therefore, region b is readout of the b rows of the array closest to the N horizontal shift registers with a total of "b" vertical shifts (step 608). With the accumulated charge from each pixel column of region b in a horizontal shift register, that charge is readout in N sequential horizontal shifts (step 610). Since the data in each horizontal shift register is associated with a wavelength, the data can be shifted directly into storage as a large-amplitude channel wavelength measurement (step 612). Once the large-amplitude channel has been stored, the small- and large-amplitude data can be processed into a spectrum. However, before describing the post-processing of the two-channel data in greater detail, an appreciation of the two-region line binning mode with more specific regard to obtaining optical spectroscopy measurements would be helpful.

Initially, the data obtained from large region b, may be generally characterized as having a much better signal-to-noise ratio than that data obtained from small region a. Depending on the region selection, the signal-to-noise ratio may approach that of the data from an entire M pixel line. However, in a similar manner as the M pixel lines, the columns of region b (recall b=M−a) are susceptible to saturating in higher illumination regions of the spectrum. The data in the small region is much less susceptible to saturation, at least with regard to the well depth of the horizontal shift registers, since the area is smaller and less total charge can accumulate over the region. Therefore, in accordance with one aspect of an exemplary embodiment of the present invention, the saturated data obtained from the larger amplitude region can be supplanted with unsaturated data from the small amplitude region, thus enhancing the dynamic range of the spectral data. The data are replaced on a column-by-column basis.

The values of a and b may be chosen in accordance with the enhancement of dynamic range desired. The improvement in dynamic range realized will be approximately:

$$\frac{M}{\text{Min}\left(a, \frac{F_h}{F_p}\right)} \quad (1)$$

where $F_p$ and $F_h$ are the full-well capacities of a pixel and horizontal shift registers, respectively. For the Hamamatsu S7031-1007 device, the theoretical maximum increase in dynamic range that could be achieved according to this formula is about 60 over the performance in line binning mode, assuming a=2 and using the fact that the ratio of horizontal to vertical shift register capacity is 2. The actual improvement may differ from the number calculated here because the spectral image formed by the optics may not be uniform in the vertical direction. It should be understood that with the improvement in dynamic range comes additional noise on the signal in the small-amplitude channel. This noise can be reduced, but only at the expense of the improvement in dynamic range. For instance, selecting a value of a=10 will reduce the improvement in dynamic range by a factor of 10, but simultaneously reduce the noise by up to a factor of $\sqrt{10}$.

In accordance with an exemplary embodiment of the present invention, spectrographs utilizing the two-region line binning mode may operate with light sources bright enough to cause saturation in the line binning mode even at the shortest integration time available. However, the minimum integration time required for performing the two-region line binning ($t_{ab(min)}$) is longer than that which might be achieved using the prior art line binning mode ($t_{M(min)}$) by the amount of time necessary for making additional N horizontal shifts ($t_{horiz}$). Typically, the minimum integration time for one CCD readout in prior art line binning mode is defined as:

$$t_{M(min)} = Mt_{vert} + Nt_{horiz} \quad (2)$$

The two-region line binning mode involves dividing the full column vertical shift into two partial column shifts and an additional full horizontal shift as defined below:

$$t_{ab(min)} = at_{vert} + Nt_{horiz} + bt_{vert} + Nt_{horiz} \quad (3)$$

since $at_{vert} + bt_{vert} = Mt_{vert}$ Equation (3) becomes:

$$t_{ab(min)} = Mt_{vert} + 2Nt_{horiz} \quad (4)$$

Assuming $t_{horiz} \cong t_{vert}$, in CCD arrays where N>>M; $Nt_{horiz}$>>$Mt_{vert}$ and therefore:

$$t_{ab(min)} \approx 2t_{M(min)} \quad (5)$$

As a practical matter, most CCD arrays used in spectrographs are configured with far more horizontal columns than vertical rows, N>>M, so it is a good approximation to say that the cost of using the two-region line binning method is to double the minimum integration time which can be achieved. When dealing with very bright sources, the brightest source that can be measured using the prior art is that which just saturates a horizontal shift register when the minimum integration time is used. Using the two-region line binning mode, the integration time will be effectively doubled, so the same source will not saturate the horizontal shift register for any value of a such that a<M/2. Accordingly, another way to choose a and b is to have a target value in mind for the level of signal in a particular column or range of columns corresponding to a range wavelengths, and, by use of Equation (1), choose a to yield the targeted signal level in the a-channel. This may result in the size of region b being sufficiently reduced so that the signal-to-noise ratio in that channel is reduced, but in certain applications this may not be of concern.

One final matter should be considered prior to employing the presently described two-region line binning mode, that is the establishment of a relationship between the amplitude measurements of the small-amplitude channel and the large-amplitude channel. Optimally, the relationship between channels is linear for each wavelength and may be established by comparing one or more amplitudes from each channel associated with each wavelength. The level of these amplitudes should be higher than the inherent electronic noise level of the CCD and below its saturation level.

Figure 7:
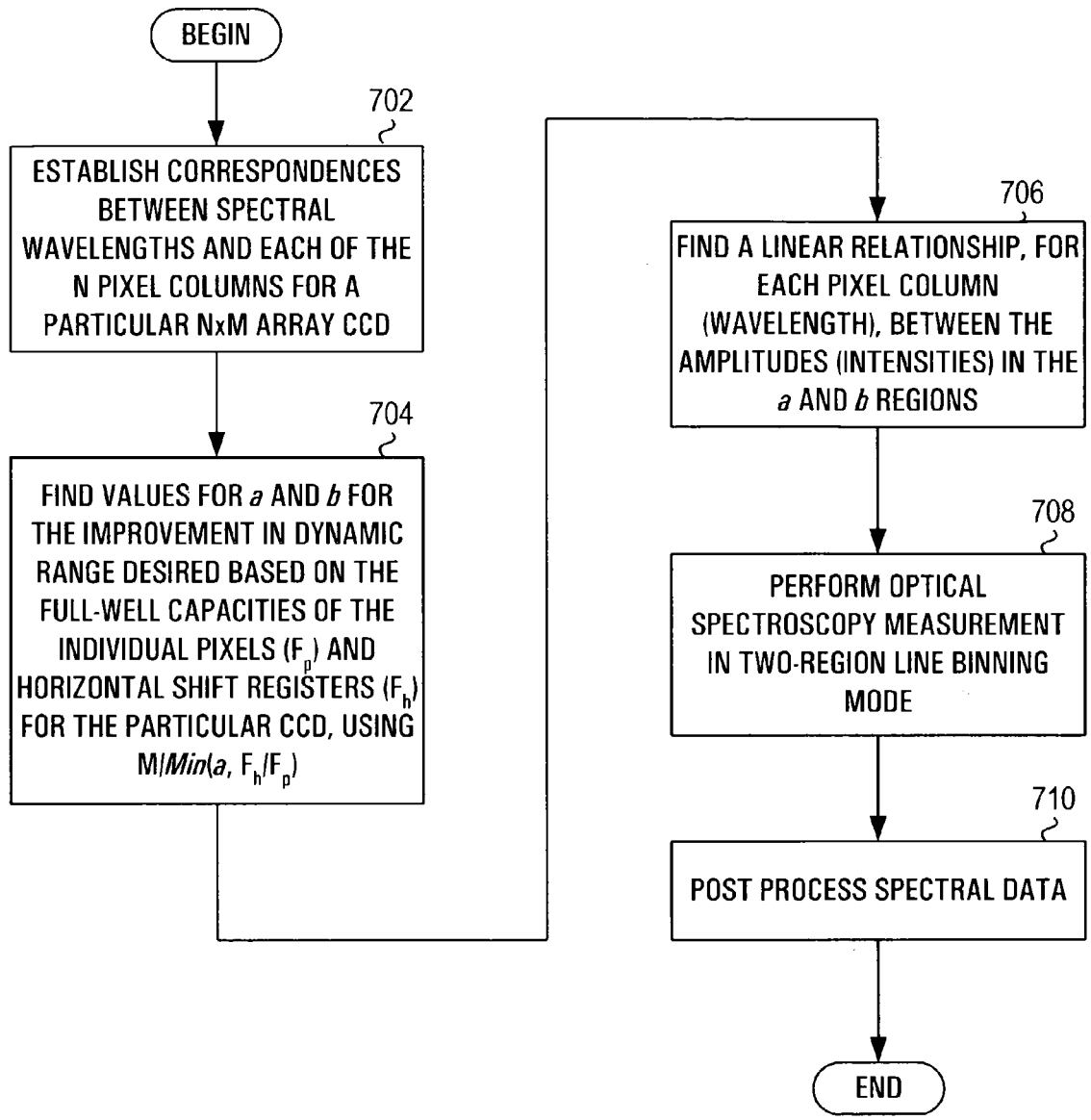
FIG. 7 is a flowchart depicting a method for implementing the present two-region line binning methodology in optical spectroscopy measurements using an optical sensor having a N×M pixel array in accordance with an exemplary embodiment of the present invention.

FIG. 7 is a flowchart depicting a method for implementing the present two-region line binning methodology in optical spectroscopy measurements using an optical sensor having a N×M pixel array in accordance with an exemplary embodiment of the present invention. It is presumed that the array is aligned with spectral wavelengths corresponding to pixel columns. The process begins by establishing correspondences between spectral wavelengths and each of the N pixel columns (step 702). Typically, this step is often omitted as the spectrograph is normally pre-configured. Next, regions a and b are defined on the M×N array (step 704). Values for a and b can be determined based on the amount of reduction required to avoid saturating the spectrum in the a-channel using Equation (1) above. The enhancement in the dynamic range is the ratio of the total number of pixels in a column to the greater of a, or the number of pixels it would take to saturate the horizontal shift register if they themselves were saturated. As should be readily apparent from Equation (1), the maximum dynamic range enhancement is achieved where a=$F_h$/F, and as the value of a increases, a>1, the signal-to-noise ratio increases on the large-amplitude channel.

It is expected that the spectral data from a large-amplitude channel would be used everywhere except in wavelengths with amplitudes indicating they are in saturation, in which case the small-amplitude channel would be used. One exemplary means for handling the data is to combine the information from both the small- and large-amplitude channels into a single, wide-dynamic-range spectrum. This may be accomplished by establishing a linear relationship between the amplitudes in the respective channels, and linearly scaling the data from a small-amplitude channel using that relationship (step 706). A relationship may be determined, optimally a single relationship, but if necessary a different relationship for each wavelength, by comparing amplitudes from the two channels across the working range of the large-amplitude channel, i.e., at amplitudes sufficiently above the electronic noise and below saturation. The linear relationship data for each wavelength is necessary for each wavelength is then stored for use in post-processing the amplitudes. The relationships are generally device-specific and therefore should be determined for each spectrograph to be operated in two-region line binning mode.

Once the desired improvement in dynamic range and the linear relationships between the amplitude channels have been determined, the optical spectroscopy measurements may be taken in two-region line binning mode (step 708). As mentioned above, the presently described two-region line binning mode will yield two data channels of raw spectroscopy data each readout, a large-amplitude data channel, and a small-amplitude data channel. Data in these two channels from may be post-processed into a more useful form (step 710). One way is to merely present the alternating reads as separate channels in a two-channel spectrograph. The large-amplitude channel would be used everywhere except where its amplitude indicates that it is in saturation, in which case the small amplitude channel would be used.

Figure 8:
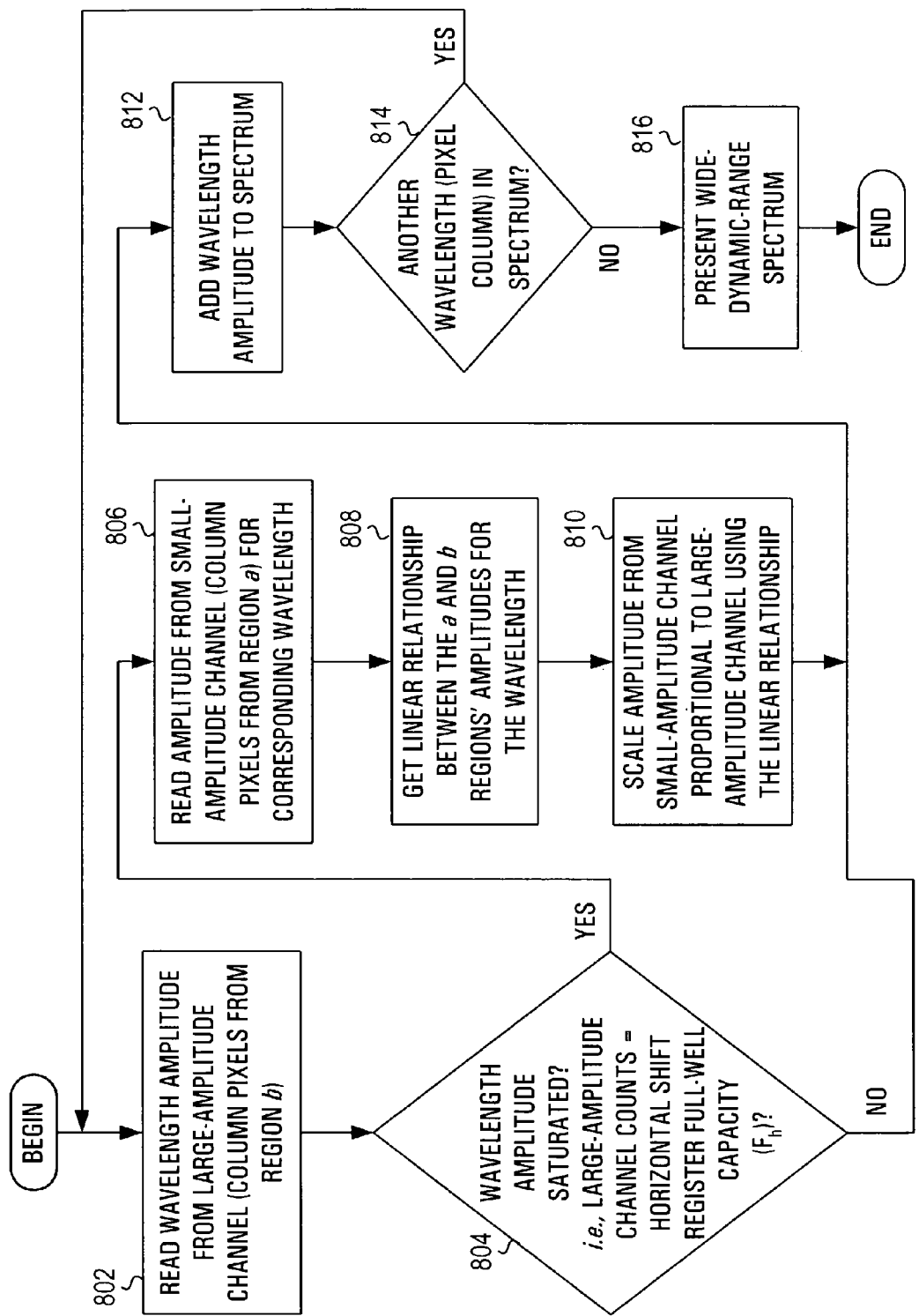
FIG. 8 is a flowchart depicting a post-processing method for combining the small- and large-amplitude channel measurements into a single wide-dynamic-range spectrum in accordance with an exemplary embodiment of the present invention.

As an alternative to presenting the data as a two-channel spectrographic presentation, the two-channel amplitude data from both small and large-amplitude channels may be combined into a single, wide-dynamic-range spectrum. FIG. 8 is a flowchart depicting a post-processing method for combining the small- and large-amplitude channel measurements into a single, wide-dynamic-range spectrum in accordance with an exemplary embodiment of the present invention. Initially, it is assumed that each channel of amplitude data for a spectrum measurement is separately buffered. The process begins by reading the large-amplitude data out of memory obtained from region b (step 802). The spectrum is read one discrete wavelength after another and tested for saturation at each wavelength (step 804). If a wavelength amplitude is not saturated, i.e., the amplitude measurement is below the saturated value (e.g., 65535 counts), the amplitude measurement is added to the spectrum without further processing (step 812), and the spectrum is tested for completeness (step 814). If the spectrum is complete, it is presented as a single, wide-dynamic-range spectrum (step 816). If the spectrum is not complete, the process reverts to step 802 and reads another wavelength from the buffer holding the large-amplitude channel data and that amplitude is tested for saturation (step 804). When a wavelength amplitude is determined to be saturated, the small-amplitude channel amplitude is read from the small-amplitude buffer for the corresponding wavelength (step 806). Since the small-amplitude data is sampled from fewer pixel rows than the large amplitude data, the amplitude is smaller than the larger-amplitude data, but linearly related. The linear relationship for the wavelength, determined by the technique described in step 706 above, is retrieved (step 808), and applied to the amplitude of the small-amplitude channel (step 810). By doing so, the amplitude from the small-amplitude channel is scaled proportional to the large-amplitude channel. That amplitude can then be added to the spectrum (step 812), and the spectrum is tested again for completeness (step 814). The process iterates through the wavelengths of the spectrum until an entire wide-dynamic-range spectrum has been assembled, one wavelength at a time. The resultant wide-dynamic-range spectrum is composed primarily from the amplitude measurements of the large-amplitude channel. Since the signals whose measurements are derived from the small-amplitude channel are large, they are not susceptible to interference by the much smaller noise level, while the small signals which are susceptible to such interference are derived from the large-amplitude channel which is nearly as noise-free as spectral data generated using the prior art line binning mode (especially in applications where b>>a and M≈b).

Therefore, the dynamic range of the composite spectrum is much larger than that of a spectrum generated using the prior art.

Figure 9:
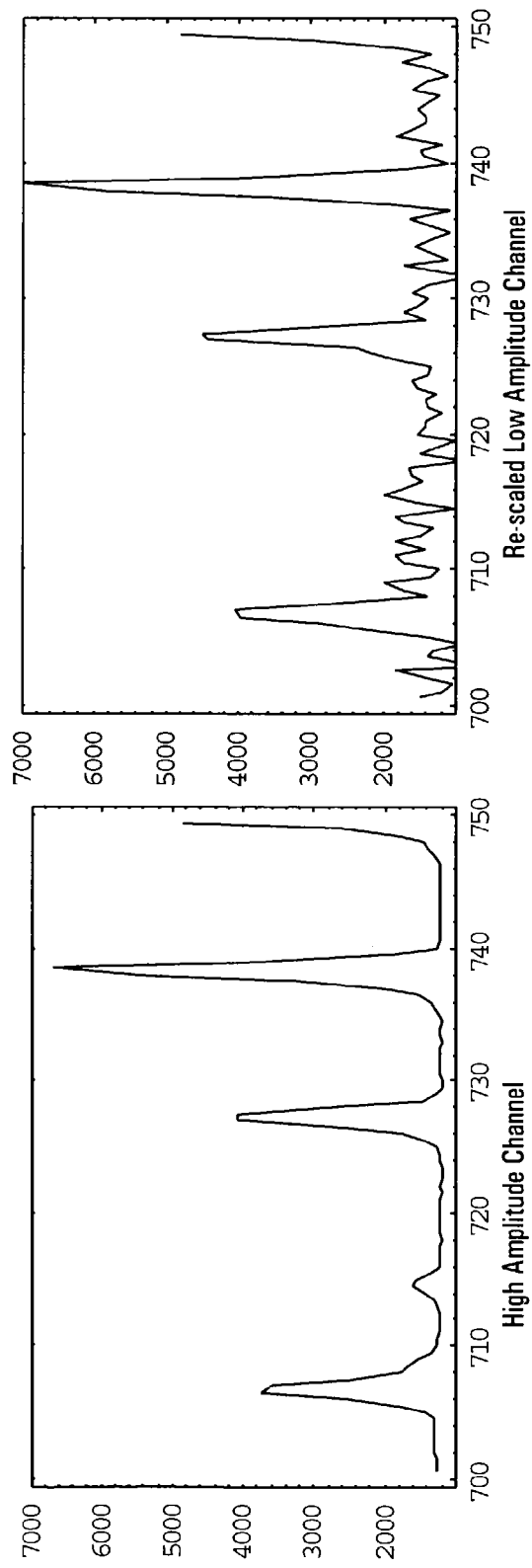
FIG. 9 is a diagram illustrating the low intensity region of a spectrum read out in two channels, in accordance with an exemplary embodiment of the present invention.

A spectrograph (SD1024) manufactured by Verity Instruments, Inc., 2901 Eisenhower Street, Carrollton, Tex. 75007 was modified to use the disclosed method, using a=1 and b=121. The output range of the spectrograph in line binning mode is 0-65535. The spectra were read out in separate channels, and the small-amplitude channel was re-scaled to the same scale as the large-amplitude channel. The high-intensity channel is essentially the same as what would have been observed if conventional line binning had been used. The enhancement to the dynamic range which was observed was a factor of 23. FIG. 9 is a diagram illustrating the low intensity region of a spectrum read out in two channels, in accordance with an exemplary embodiment of the present invention. FIG. 9 shows a portion of a spectrum where the intensity is low, so neither channel is saturated. In this region, the large-amplitude channel (left) gives better results. The small-amplitude channel (right) has been re-scaled so as to make the scale the same as that of the large-amplitude channel (left). Since neither the large-amplitude channel nor the small-amplitude channel is saturated, the better measurement in this region comes from the large-amplitude channel.

Figure 10:
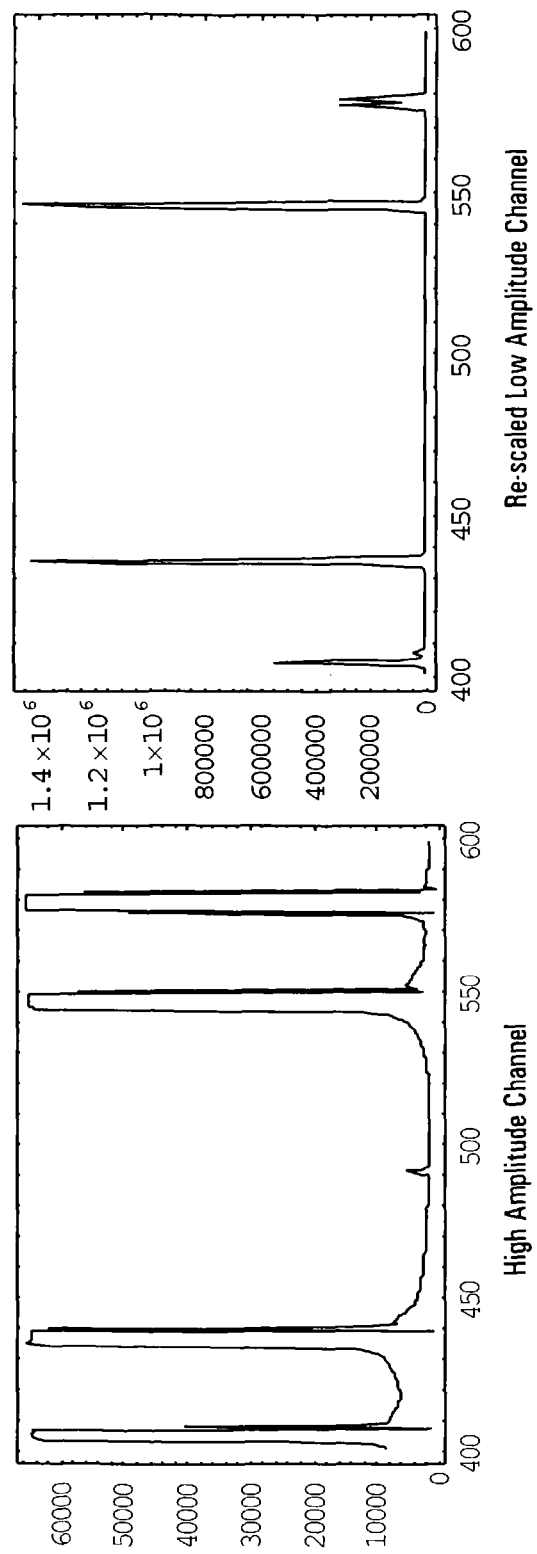
FIG. 10 is a diagram illustrating the high intensity region of the spectrum read out in two channels, in accordance with an exemplary embodiment of the present invention.

FIG. 10 is a diagram illustrating the high intensity region of the spectrum read out in two channels (the spectrum shown in FIG. 9), in accordance with an exemplary embodiment of the present invention. In this region, the large-amplitude channel (left) is saturated, but the small-amplitude channel (right) gives usable results. The large-amplitude channel (left) is truncated at 65536 counts, and is unusable because of saturation. The re-scaled small-amplitude channel (right) saturates at 1,500,000 counts. The increase in dynamic range is 23 fold.

The choice for a, or a and b, can be made in conjunction with various events depending on the intended application for the imaging device. For instance, a value for a may be determined during an initial set-up stage for the imaging device. With regard to a spectrograph, test data may be gathered and used for selecting a value for a, or a and b, such that the signal amplitude of one or more selected wavelengths from either the a-channel or b-channel fall within a range of target amplitudes.

Alternatively, a value for a may be determined on the fly between sequential imaging sensor readouts and used thereafter. This mode of operation is extremely useful for certain applications in which a series of spectrographic measurements are taken of, for instance, an ongoing process. In accordance with this exemplary embodiment of the present invention, a time or point in the process is determined for selecting a value for a, or a and b. At the predetermining point in the process, the amplitude of one or more selected wavelengths from either the a-channel or b-channel are compared to a range of target amplitudes. If the signal amplitude falls within the target range, no further adjustments of the value of a, or a and b, are necessary. If not, the value of a, or a and b, is adjusted in the desired direction and another measurement is taken. The value of a, or a and b, is iteratively adjusted between measurements until the signal amplitude falls within the range of targets amplitudes. Once set, the values of a and b remain fixed for the remainder of the process. With regard to a specific example, if a signal amplitude for a selected wavelength is too high on the b-channel and too low on the a-channel, the value of a may be increased in each measurement by doubling the value of a, for instance, until the amplitude of the a-channel is within the range of target amplitudes. Conversely, if a signal amplitude for the selected wavelength is too high on the b-channel and also too high on the a-channel, the value of a may be decreased in each measurement by halving the value of a, for instance, until the amplitude of the a-channel is within the range of target amplitudes. In a case where both the signal amplitudes for the selected wavelength on the a-channel and the b-channel are too low, one of the values for a and b may be increased in each measurement by doubling the value, for instance, until the amplitude of that channel is within the range of target amplitudes or until that value=M (no further adjustments to the value are physically possible).

Figure 1:
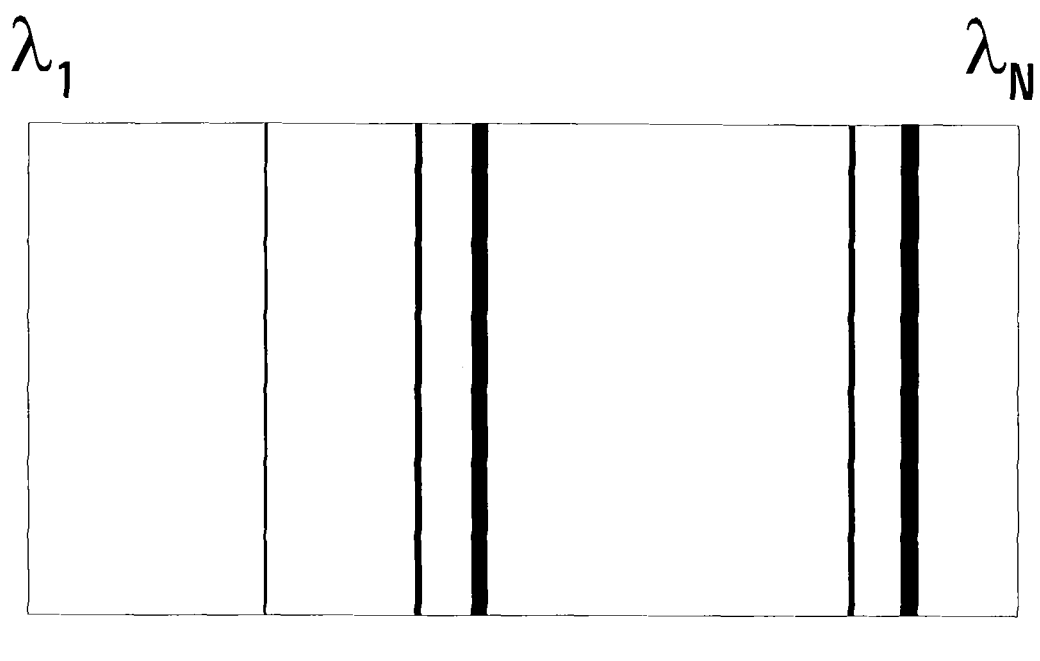
FIG. 1 is a diagram illustrating the image from a spectrograph, wherein the longer dimension (horizontal) corresponds to wavelength as generally understood in the prior art.
Figure 11:
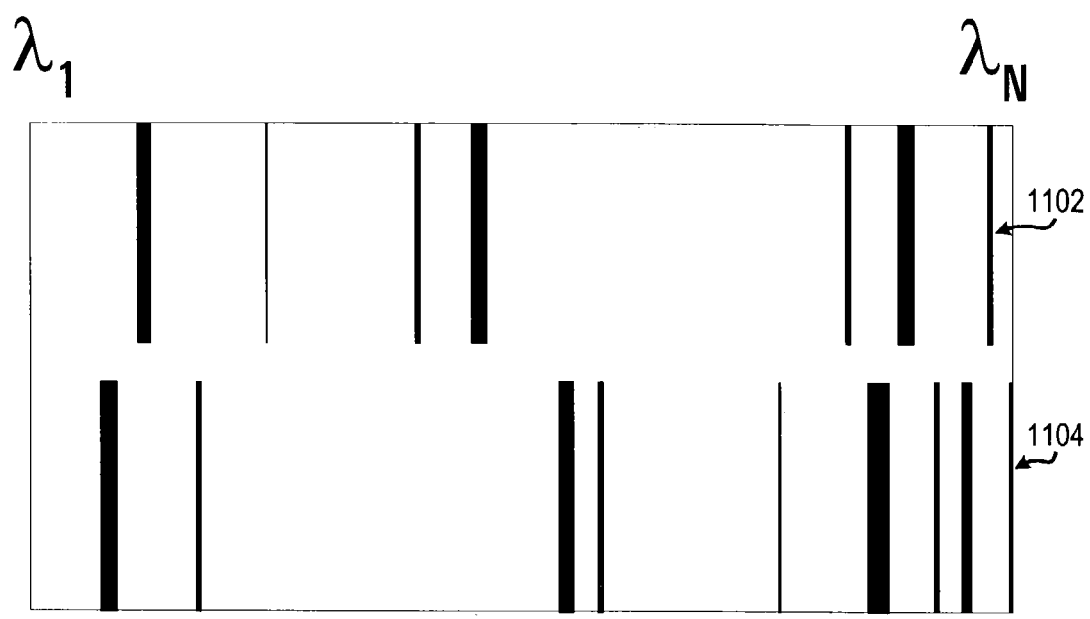
FIG. 11 is a diagram of the spectral images in the focal plane of an imaging spectrograph wherein the image is visualized as a rectangle with the long dimension corresponding to wavelength.

In an imaging spectrograph, the optics have the further capability to resolve multiple spectra from different light sources which are incident in different regions of the slit. FIG. 11 is a diagram of the spectral images in the focal plane of an imaging spectrograph wherein the image is visualized as a rectangle with the long dimension corresponding to wavelength. Spectrum 1102 is projected above a second spectrum 1104 with a slight separation between them. In accordance with an exemplary embodiment of the present invention, two or more rectangular images arrayed along a direction perpendicular to the wavelength axis, each having its own independent intensity versus wavelength distribution, and each one reduced in extent perpendicular to the wavelength direction so that the total extent of the composite image is equal to the extent of the single image is depicted above in FIG. 1.

The simplest example of a composite image from an imaging spectrograph is a two-channel spectrum, where there are two sources, say, sources C and A, each with a corresponding image region on the imaging array. In this case, the presently described two-region line binning mode is not appropriate, since, inter alia, each source projects a separate image having an independent intensity versus wavelength distribution. Consider the application of two-region line binning to region A, in which it is further subdivided into regions A' and B', these being related to the original region A in the same way as the regions a and b were related to the entire image in the case of a conventional, nonimaging spectrograph. At the end of an integration, the charge from part of region A, i.e., region A', is moved into the shift register. Simultaneously, some of the charge from region C is moved into the region B' portion of region A, that region of the imaging array lying between region C and the shift register. The charge from region C that is now in region B' is exposed to light source A. While the series of horizontal shifts which are used to read the signal from region A' are carried out, light source A adds charge to that shifted down from region C. Eventually, when the charge from region C is read, it will be in error owing to the presence of charge from region A having been mixed with it. Similar considerations affect the signals from each region.

Figure 12:
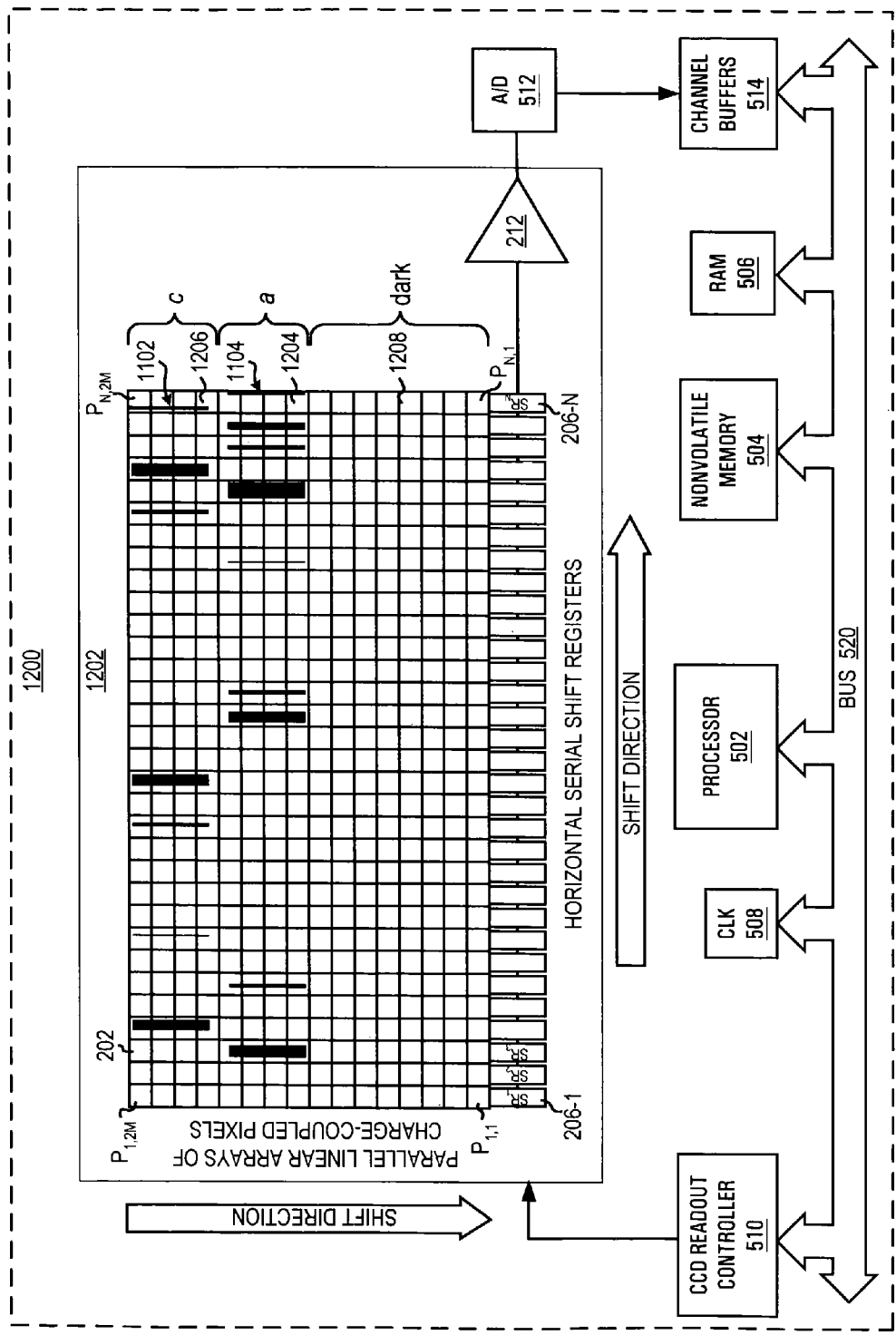
FIG. 12 is a diagram which generally depicts a device for carrying out a variation of the two-region line binning technique applicable to imaging spectrographs in which two or more images are projected in accordance with an exemplary embodiment of the present invention.

FIG. 12 is a diagram which generally depicts a device for carrying a variation of the two-region line binning technique applicable to imaging spectrographs in which two or more images are projected, each having independent intensity versus wavelength distribution in accordance with an exemplary embodiment of the present invention. Device 1200 is similar in many aspects to device 500 described above with regard to FIG. 5, and therefore only the differences will be discussed. In general, however, imaging array 1202 is selected which has twice the number of pixels, say 2M pixels, in the direction perpendicular to the wavelength direction as are necessary to accommodate the composite image with the image falling on the top half of array 1202. The upper half of array 1202 is subdivided into regions corresponding to distinct images projected thereon. By way of example, top half of array 1202 is subdivided into region a having pixels 1204, and region c with pixels 1206. In the depicted figure, spectrum 1102 is projected on region c above spectrum 1104 which is projected onto region a. In practice, however, the upper portion of the array exposed to the light may be subdivided into any number of regions without departing from the scope of the present invention. The lower half of array 1202 comprises a dark region with pixels 1208. The dark region lies outside the image and therefore pixels 1208 are never exposed to light. Alternatively, pixels 1208 may be shielded from any potential light contamination with an opaque mask.

During operation, spectrum 1102 and spectrum 1104 are projected onto regions a and c causing charge to accumulate in pixels 1206 and 1204, respectively. After the upper half of imaging array 1202 is exposed to light for a predetermined time period, $t_{int}$, the entire image is rapidly shifted M pixels down into pixels 1208 of the dark region. Subsequent to horizontal shift registers 206 being emptied, the charge accumulated from region a, corresponding to spectrum 1104, is shifted in horizontal shift register 206 and then horizontally shifted out as a-channel signals. Then the charge accumulated in pixels 1102 from region c, corresponding to spectrum 1102, may be shifted into horizontal shift register 206 and read out as c-channel signals.

Figure 13:
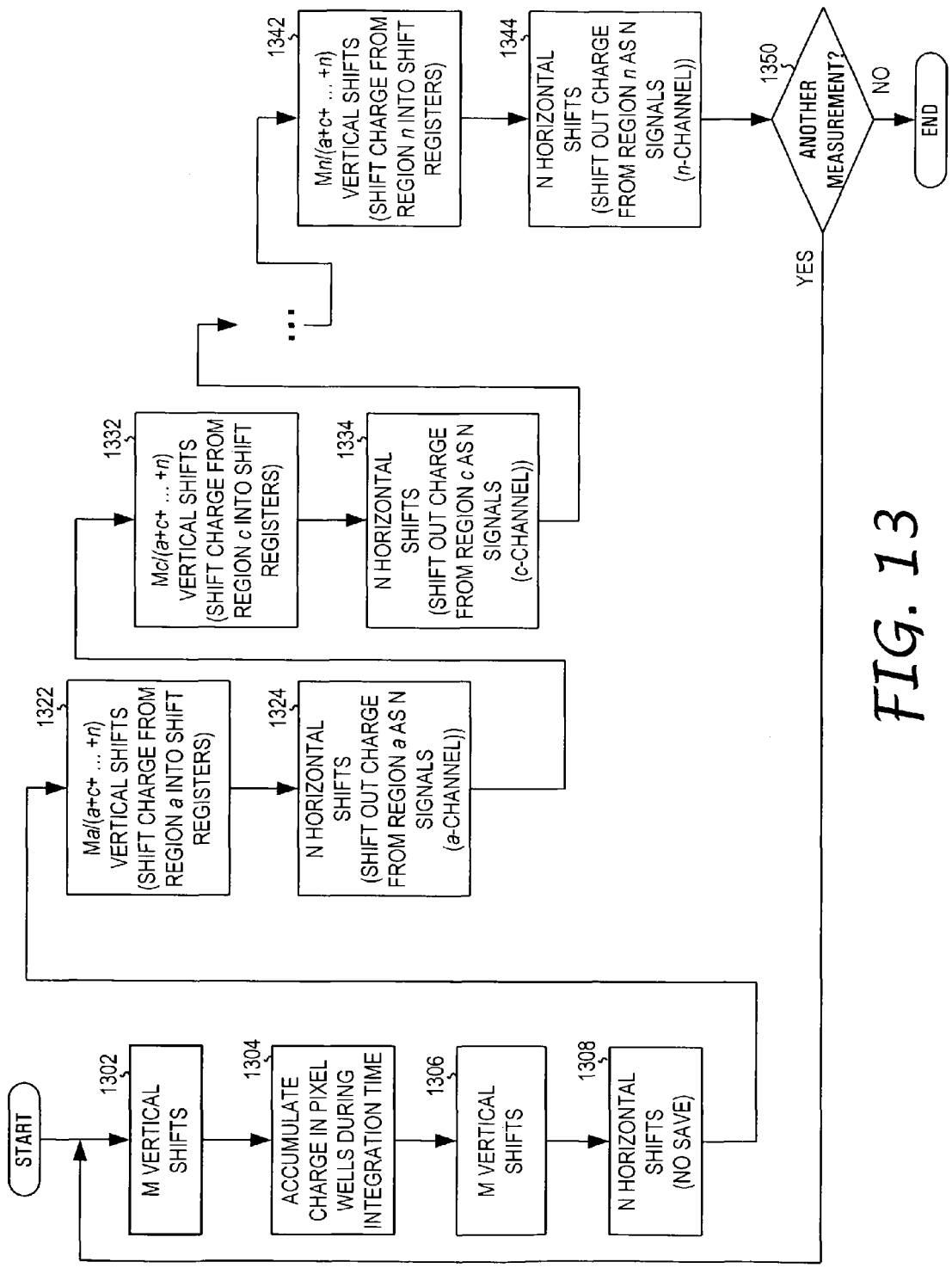
FIG. 13 is a flowchart of a process for reading out charge accumulated in multiple regions on a N×2M pixel array without contaminating charge accumulated in one region with charge accumulated in another region in accordance with an exemplary embodiment of the present invention.

With further regard to carrying a variation of the two-region line binning technique, FIG. 13 is a flowchart depicting a detailed process for reading out charge accumulated in multiple regions on a N×2M pixel array which includes a dark region to prevent contamination of charge accumulated in one region with charge accumulated in another region in accordance with an exemplary embodiment of the present invention. The present process is particularly applicable when resolving multiple spectra from different light sources which are incident in different regions of the imaging spectrograph's slit. Generally, the imagining array is defined as having n+1 separate pixel regions. One region is the dark lower half of the array. The dark region comprises at least M pixel rows and lying entirely outside of the image (depicted in FIG. 12 as pixels 1208). n uncovered regions in the upper portion of the array are exposed to light (depicted in FIG. 12 as pixels 1204 and 1206 for regions a and c, respectively). Assuming only M pixel rows are in the dark region, each of the n upper regions have a predetermined proportion of pixel rows of the array such that region a comprises Ma/(a+c+ . . . +n) pixel rows; region c comprises Mc/(a+c+ . . . +n) pixel rows until region n comprises Mn/(a+c+ . . . +n) pixel rows. One or more images are projected onto the upper half of the array, each image corresponding to one or more of the n uncovered regions.

A measurement cycle begins by clearing the upper portion of the array N×2M imaging array by making M vertical shifts (step 1302). Subsequently, charge is integrated in the n regions for a predetermined integration time period, $t_{int}$ (step 1304). Following integration, charge accumulated in the n regions in the upper half of the array is moved into the dark region using M vertical shifts (step 1306). At this point in the process, shift registers 206 contain unwanted charge, and are therefore emptied without saving the data by making M horizontal shifts (step 1308).

Next, charge accumulated in the open regions, i.e., regions a, c, . . . , and n, is transferred from the dark region through the shift registers and into memory as N channel signals using a series of iterative readouts, one readout for each region's charge stored in the dark region. Each readout comprises a set of vertical shifts equal to the number of pixel rows in the respective region (for shifting the charge from the dark region and into the N shift registers), and N horizontal shifts (for shifting the charge out of the N shift registers and into, for example, a memory). For the lowermost region's charge now in the dark region, the charge is shifted from the dark region to the N shift registers in Ma/(a+c+ ... +n) vertical shifts (step 1322) and then out of the registers in N horizontal shifts (step 1324). The next region's charge in the dark region is transferred into the N shift registers with Mc/(a+c+ ... +n) vertical shifts (step 1332) and out of the N shift registers in N horizontal shifts (step 1334). The readout process iterates through the region's charge now in the dark region until the final region, region n. Then that charge is shifted out with Mn/(a+c+ ... +n) vertical shifts (step 1342) and out with N horizontal shifts (step 1344). The process for one measurement then ends. In practice, of course, the readout process loops around and continues by clearing the dark region (step 1302) until all measurements have been taken.

During the time the charge stored in the dark region is being read out, unwanted charge is accumulating in regions a, c ... and n in the upper half of the array. Should another measurement be desired (step 1350), the measurement cycle commences with the unwanted charge being cleared from the regions a, c ..., and n in the upper half of the array as before in M vertical shifts (step 1302). The process continues as described above until no further measurements are desired (step 1350).

In the process described above, charge accumulated in each of the regions a, c, ..., and n is read out in a single series of vertical shifts, i.e., there is only one horizontal shift for each of the regions a, c, ..., through n. But, on analogy with the bifurcation of the entire array in FIG. 5 into separate regions a and b, each distinct region a, c, ..., through n. in FIG. 12 may be further subdivided. For example, region a may be further subdivided into region a' and a complementary region, region b, where a=a'+b, affording the advantages detailed above with respect to enhanced dynamic range. All, any or none of the regions may be subdivided as desired. Furthermore, the details of the subdivision may be changed at will between readout cycles without departing from the scope and spirit of the invention.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for enhancing dynamic range of data read from an imaging sensor, the imaging sensor comprising N linear pixel arrays, each of the N linear pixel arrays having M charge coupled pixels, each pixel charge coupled, and further being coupled to one of N registers, the method comprising:
    integrating charge in at least some pixels of the N linear pixel arrays;
    combining charge from a first region of the N linear pixel arrays of the imaging sensor in the N registers by shifting charge from the first region along each of the N linear pixel arrays to each of the N registers, the first region of the N linear pixel arrays having at least one pixel line and the at least one pixel line of the first region is oriented in an orthogonal direction to the N linear pixel arrays;
    shifting charge from the N registers along a linear path;
    representing charge from at least a portion of the first region of the N linear pixel arrays, shifted out of the N registers, as a corresponding portion of N first region data signals;
    combining charge from a second region of the N linear pixel arrays in the N registers by shifting charge from the second region along each of the N linear pixel arrays to each of the N registers, the first and second regions having at least three pixel lines, and the at least three pixel lines being oriented in an orthogonal direction to the N linear pixel arrays;
    shifting charge from the N registers along a linear path;
    representing charge from at least a portion of the second region of the N linear pixel arrays, shifted out of the N registers, as a corresponding portion of N second region data signals; and
    defining the first region of the N linear pixel arrays of the imaging sensor by designating at least one pixel line as belonging to the first region of the N linear pixel arrays, wherein defining the first region of the N linear pixel arrays of the imaging sensor by designating at least one pixel line as belonging to the first region of the N linear pixel arrays further comprises:
        assessing a level of improvement in dynamic range in at least one signal taken from the corresponding portion of N first region data signals, and the corresponding portion of N second region data signals; and
        determining an amount of pixel lines belonging to the first region of the N linear pixel arrays for improving the dynamic range in the at least one signal, wherein the amount of pixel lines relates to the level of improvement in dynamic range.

2. The method for increasing dynamic range recited in claim 1 above further comprises:
    presenting the corresponding portion of N first region data signals; and
    presenting the corresponding portion of N second region data signals.

3. The method for increasing dynamic range recited in claim 2 above, wherein a first portion comprises the corresponding portion of N first region data signals and a second portion comprises the corresponding portion of N second region data signals.

4. The method for increasing dynamic range recited in claim 1 above, wherein defining the first region of the N linear pixel arrays of the imaging sensor by designating at least one pixel line as belonging to the first region of the N linear pixel arrays further comprises:
    setting at least one target signal level;
    selecting at least one signal from one of the corresponding portion of N first region data signals and the corresponding portion of N second region data signals; and
    comparing the selected at least one signal to the at least one target signal level; adjusting an amount of pixel lines belonging to the first region of the N linear pixel arrays, wherein the adjustment is based on the comparison of the selected at least one signal to the at least one target signal level.

5. The method for increasing dynamic range recited in claim 4 above, wherein adjusting an amount of pixel lines belonging to the first region of the N linear pixel arrays further comprises altering the amount of pixel lines belonging to the first region by a predetermined proportion of the amount of pixel lines.

6. The method for increasing dynamic range recited in claim 4 above, wherein adjusting an amount of pixel lines belonging to the first region of the N linear pixel arrays further comprises altering the amount of pixel lines belonging to the first region by a predetermined number of pixel lines.

7. The method for increasing dynamic range recited in claim 4 above further comprises modifying an amount of pixel lines belonging to the second region based on the sum of pixel lines in the first region and second region being equivalent to an amount of pixels in any one of the N linear pixel arrays.

8. The method for increasing dynamic range recited in claim 7 above, wherein the amount of pixels in each of the N linear pixel arrays is M pixels.

9. The method for increasing dynamic range recited in claim 7 above further comprises:
integrating charge in at least some pixels of the N linear pixel arrays;
combining charge from the first region of the N linear pixel arrays of the imaging sensor in the N registers by shifting charge from the adjusted amount of pixel lines of the first region along each of the N linear pixel arrays to each of the N registers;
shifting charge from the N registers along a linear path;
representing charge from at least a portion of the first region of the N linear pixel arrays, shifted out of the N registers, as a corresponding portion of the N first region data signals;
combining charge from the second region of the N linear pixel arrays in the N registers by shifting charge from the modified amount of pixel lines belonging to the second region along each of the N linear pixel arrays to each of the N registers; and
shifting charge from the N registers along a linear path; and
representing charge from at least a portion of the second region of the N linear pixel arrays, shifted out of the N registers, as a corresponding portion of the N second region data signals.

10. The method for increasing dynamic range recited in claim 4 above, wherein the adjustment based on the comparison of the selected at least one signal to the at least one target signal level relates to difference between the selected at least one signal to the at least one target signal level.

11. The method for increasing dynamic range recited in claim 4 above, wherein the at least one target signal is a range of target signal levels, and the adjustment based on the comparison of the selected at least one signal to the at least one target signal level relates to a difference between the selected at least one signal to the range of target signal levels.

12. The method for increasing dynamic range recited in claim 1 above, wherein defining the first region of the N linear pixel arrays of the imaging sensor is accomplished during a setup phase of a device incorporating the imaging sensor.

13. The method for increasing dynamic range recited in claim 1 above, wherein defining the first region of the N linear pixel arrays of the imaging sensor is accomplished dynamically, following the integrating charge in at least some pixels of the N linear pixel arrays, and prior to a subsequent integration of charge in at least some pixels of the N linear pixel arrays.

14. The method for increasing dynamic range recited in claim 1 above further comprises:
presenting the corresponding portion of N first region data signals as a first channel of small-amplitude signals; and
presenting the corresponding portion of N second region data signals as a second channel of large-amplitude signals.

15. The method for increasing dynamic range recited in claim 14 above further comprises:
re-scaling one of the small-amplitude signals from the first region and the large-amplitude signals from the second region.

16. The method for increasing dynamic range recited in claim 15 above, wherein re-scaling one of the small-amplitude signals from the first region and the large-amplitude signals from the second region is based on a scale of the other of the small-amplitude signals from the first region and the large-amplitude signals from the second region.

17. The method for increasing dynamic range recited in claim 14 above further comprises:
determining a relationship between the small-amplitude signals of the first channel from the first region, and the large-amplitude signals of the second channel from the second region.

18. The method for increasing dynamic range recited in claim 17 above further comprises:
applying the relationship to the corresponding at least one data signal from the N data signals representing charge from the first region of the N linear pixel arrays; and
replacing the at least one of the N data signals representing a saturated condition from the second region of the N linear pixel arrays.

19. The method for increasing dynamic range recited in claim 18 above, wherein each of the N linear pixel arrays corresponds to a wavelength channel of an N wavelength channel spectrum and each of the N data signals represents an amplitude of the N wavelength channels of the spectrum.

20. The method for increasing dynamic range recited in claim 19 above further comprises:
presenting as a wide dynamic-range spectrum, the data signals from the second channel of large-amplitude signals representing charge from the second region, and, the corresponding at least one data signal from the N data signals representing charge from the first region of the N linear pixel arrays replacing the at least one of the N data signals representing a saturated condition from the second region of the N linear pixel arrays.

21. The method for increasing dynamic range recited in claim 1 above, wherein each of the corresponding portion of N first region data signals and each of the corresponding portion of N second region data signals both correspond to at least one discrete wavelength.

22. The method for increasing dynamic range recited in claim 1 above further comprises:
combining a part of the corresponding portion of N first region data signals with a non-corresponding part of the portion of N second region data signals; and
presenting the part of the corresponding portion of N first region data signals and the non-corresponding part of the portion of N second region data signals as a plurality of data signals.

23. A computer program product, comprising a non-transitory computer-readable medium having stored thereon computer executable instructions that direct the operation of a processor when executed to implement a method for enhancing dynamic range of data read from an imaging sensor having a controller that executes a plurality of reordered commands, the computer executable instructions comprising:
instructions for integrating charge in at least some pixels of N linear pixel arrays;
instructions for combining charge from a first region of N linear pixel arrays of the imaging sensor in N registers by shifting charge from the first region along each of the N linear pixel arrays to each of the N registers, the first region of the N linear pixel arrays having at least one pixel line and the at least one pixel line of the first region is oriented in an orthogonal direction to the N linear pixel arrays;

instructions for shifting charge from the N registers along a linear path;

instructions for representing charge from at least a portion of the first region of the N linear pixel arrays, shifted out of the N registers, as a corresponding portion of N first region data signals;

instructions for combining charge from a second region of the N linear pixel arrays in the N registers by shifting charge from the second region along each of the N linear pixel arrays to each of the N registers, the first and second regions having at least three pixel lines, and the at least three pixel lines being oriented in an orthogonal direction to the N linear pixel arrays;

instructions for shifting charge from the N registers along a linear path;

instructions for representing charge from at least a portion of the second region of the N linear pixel arrays, shifted out of the N registers, as a corresponding portion of N second region data signals;

instructions for defining the first region of the N linear pixel arrays of the imaging sensor by designating at least one pixel line as belonging to the first region of the N linear pixel arrays;

instructions for assessing a level of improvement in dynamic range in at least one signal taken from the corresponding portion of N first region data signals, and the corresponding portion of N second region data signals; and instructions for determining an amount of pixel lines belonging to the first region of the N linear pixel arrays for improving the dynamic range in the at least one signal, wherein the amount of pixel lines relates to the level of improvement in dynamic range.

24. The computer program product recited in claim 23 above further comprises:

instructions for setting at least one target signal level;

instructions for selecting at least one signal from one of the corresponding portion of N first region data signals and the corresponding portion of N second region data signals;

instructions for comparing the selected at least one signal to the at least one target signal level; and instructions for adjusting an amount of pixel lines belonging to the first region of the N linear pixel arrays, wherein the adjustment is based on the comparison of the selected at least one signal to the at least one target signal level.

25. The computer program product recited in claim 24 above further comprises:

instructions for altering the amount of pixel lines belonging to the first region by a predetermined proportion of the amount of pixel lines.

* * * * *